United States Patent [19]

Horn et al.

[11] Patent Number: 5,059,632
[45] Date of Patent: Oct. 22, 1991

[54] NOVEL COPOLYMERS AND THEIR USE AS AUXILIARIES AND/OR ADDITIVES IN FORMULATIONS FOR THE PREPARATION OF POLYISOCYANATE ADDITION POLYMERIZATION PRODUCTS

[75] Inventors: Peter Horn, Heidelberg; Gerd Rehmer, Beindersheim; Heinz-Dieter Lutter, Neckargemuend; Gerhard Ramlow, Weinheim; Werner Hinz; Hans U. Schmidt, both of Ludwigshafen, all of Fed. Rep. of Germany

[73] Assignee: BASF Aktiengesellschaft, Ludwigshafen, Fed. Rep. of Germany

[21] Appl. No.: 430,607

[22] Filed: Nov. 1, 1989

[30] Foreign Application Priority Data

Nov. 9, 1988 [DE] Fed. Rep. of Germany ....... 3838030

[51] Int. Cl.$^5$ .............................. C08G 18/62
[52] U.S. Cl. ................................ 521/137; 528/75; 264/157; 252/344; 252/8.554
[58] Field of Search ............... 521/137, 122, 128; 525/39, 440, 445; 528/52, 75; 252/8.554, 344; 264/157

[56] References Cited

U.S. PATENT DOCUMENTS 4,280,979 7/1981 Dunleavy et al. ................. 521/137

Primary Examiner—Morton Foelak
Assistant Examiner—Duc Truong
Attorney, Agent, or Firm—Martin P. Connaughton; William G. Conger

[57] ABSTRACT

This invention deals with novel copolymers having K values of from 5 to 80 prepared by the radical polymerization of:
(A) 20 to 80 weight percent, based on the total weight of (A) and (B), of at least one olefinic unsaturated polyoxyalkylene alcohol adduct or a polyester alcohol adduct;
(B) 80 to 20 weight percent, based on the total weight of (A) and (B), of at least one vinyl monomer selected from the group consisting of N-vinylformamide, N-vinyl-2-pyrrolidone, N-vinyl-piperidone, N-vinyl-2-caprolactam, N-vinylimidazole, N-vinyl-2-ethyleneurea and N-vinyl-2-propylene-urea;
(C) 0.05 to 40 parts by weight of glycidyl acrylate and/or glycidyl methacrylate;
(D) 0 to 10 parts by weight of at least one $\alpha,\beta$-monoolefinic unsaturated acid; and
(E) 0 to 30 parts by weight of at least one olefinic unsaturated carboxylic acid amide and or carboxylic acid ester and/or styrene;
whereby the parts by weight of (C), (D) and (E) are each based on 100 parts by weight of monomers (A) and (B).

The copolymers are used as auxiliaries and/or additives, for example, as dispersing agents and/or emulsification agents or as additives for improving the mechanical properties in formulations for the preparation of polyisocyanate addition polymerization products.

9 Claims, No Drawings

NOVEL COPOLYMERS AND THEIR USE AS AUXILIARIES AND/OR ADDITIVES IN FORMULATIONS FOR THE PREPARATION OF POLYISOCYANATE ADDITION POLYMERIZATION PRODUCTS

The present invention deals with novel copolymers prepared by the radical copolymerization of:
A) at least one olefinic unsaturated polyoxyalkylene alcohol adduct or polyester alcohol adduct;
B) at least one vinyl monomer selected from the group consisting of N-vinylformamide, N-vinyl-2-pyrrolidone, N-vinyl-2-piperidone, N-vinyl-2-caprolactam, N-vinylimidazole, N-vinyl-2-ethylene urea and N-vinyl-2-propylene urea; and
C) glycidyl acrylate and/or glycidyl methacrylate and with or without;
D) at least one $\alpha\beta$-monoolefinic unsaturated acid; and
E) at least one olefinic unsaturated carboxylic acid amide and/or carboxylic acid ester and/or styrene; and using the copolymers as auxiliaries and/or additives in formulations for the preparation of polyisocyanate addition polymerization products.

Numerous patents and literature publications disclose the preparation of non-cellular or cellular polyisocyanate addition polymerization products, such as, non-cellular or cellular polyurethane elastomers and flexible, semi-rigid or rigid polyurethane foams, by reacting organic polyisocyanates and/or modified organic polyisocyanates with higher molecular weight compounds having at least two reactive hydrogen atoms, for example, polyoxyalkylene polyamines and/or more preferably, organic polyhydroxyl compounds having molecular weights of from 500 to 12,000 and with or without chain extending agents and/or crosslinking agents having molecular weights up to approximately 500 in the presence of catalysts, blowing agents, auxiliaries and/or additives. By properly selecting the starting components: polyisocyanate, higher molecular weight compounds having reactive hydrogen atoms, and optionally chain extending agents and/or crosslinking agents, this method may be used to prepare elastic or rigid, non-cellular or cellular polyisocyanate addition polymerization products as well as all intermediate modifications.

An overview regarding the preparation of non-cellular and cellular polyurethane elastomers, polyurethane foams and polyisocyanurate foams, their mechanical properties and u-e, is described, for example, in the *High Polymers Monographs*, volume XVI, *Polyurethanes*, parts 1 and 2, by J. H. Saunders and K. C. Frisch, Interscience Publishers, New York, 1962 and/or 1964; in the *Plastics Handbook*, volume VII, *Polyurethanes*, 1st edition, 1966, published by R. Vieweg and A. Höchtlen, and in the 2nd edition, 1983, published by G. Oertel, Carl Hanser Publishers, Munich; and in *Integral Skin Foams*, published by H. Piechota and H. Röhr, Carl Hanser Publishers, Munich, Vienna, 1975.

In preparing non-cellular and, more preferably, cellular polyisocyanate addition polymerization products in which along with chemical reactions, colloidal chemical reactions play a significant part, efficaciously used are surface active auxiliaries, such as, surfactants, dispersing agents, and/or emulsifiers, foam stabilizers and/or cell regulators.

Surfactants, due to their emulsification effect, ensure good homogenization of the starting components and typically provide uniform foam consistency in addition to foam stabilization. In spite of numerous experiments, the mode of action for foam stabilization and foam formation still has not been conclusively clarified. The experiments were aimed at maintaining the thermodynamically unstable condition of a foam during rising through curing by surface forces. Foam stabilizers lower the surface tension of the starting component mixture and in turn act as an emulsifier for the total system. Cell regulators likewise influence the surface tension conditions of a foam mixture during the preparation of foam.

Other applications of surface active auxiliaries are, for example, preventing: the coalescence of foam bubbles during foaming, the influence of gas bubbles forming acting as nucleating cells; and air incorporation in reaction mixtures processed via a RIM process by stabilizing the incorporated air bubbles.

Compounds having different chemical structures were already used as surface active auxiliaries. Typical examples are polyoxypropylene polyoxyethylene copolymers, long chain fatty acids of polyglycols, oxethylated phenols, $C_9$–$C_{11}$-oxoalcohols, alkali stearates, alkali paraffin sulfonates, polydimethylsiloxanes, etc. Most successfully used heretofore and, therefore preferably used, are polyoxyalkylene polydimethylsiloxane block copolymers which henceforth will be called silicones.

A disadvantage of silicones is, that relatively large amounts, 1 to 2 weight percent based on the polyhydroxyl compounds, must be used. In addition, they interfere with possibly subsequent coating/painting of the cellular polyisocyanate addition polymerization products since they prevent good coating adhesion to the surface of the molded article.

In polyurethane chemistry, polyurethane formulations are also not a rarity which contain incompatible polyols as well as optionally, catalysts, blowing agents, auxiliaries and/or additives and therefore have a phase separation tendency. Typical examples are systems of higher molecular weight polyhydroxyl compounds with: incompatible glycol chain extending agents for preparing cellular or non-cellular polyurethane elastomers, for example, for shoe soles or flexible integral skin foams; or with polyhydroxyl compounds incompatible with at least trifunctional, hydroxyl group containing crosslinkers for preparing highly crosslinked non-cellular or cellular polyurethane foams, such as, cellular or non-cellular duromers; as well as systems of polyols or polyol mixtures and incompatible additives or auxiliaries, such as, for example, solid or liquid stabilizers, anti-oxidants, etc.

Using mixtures of incompatible polyols may be useful if one desires polyurethane materials having certain mechanical properties. According to Federal Republic of Germany 17 70 703 (U.S. Pat. No. 3,558,529), in this manner polyurethane foams can be prepared which demonstrate almost constant load bearing properties over a wide temperature range. However, a disadvantage of such systems is that even after brief storage the mixture separates into two phases and thus the system must be constantly mixed in order to insure a constant mix ratio of the components when processing.

Other methods have been previously described concerning homogenizing systems of incompatible starting components. Examples are European Patent A 95 116 (U.S. Pat. Nos. 4,518,521 and 4,554,340) and European Patent A 96 231, as well as the state of the art disclosed in these patent publications.

European Patent A 95 116 discloses storage stable emulsifier free polyol mixtures having a high mixed OH number and a high ethylene glycol content from higher molecular weight polyoxyalkylene polyols having OH numbers of from 20 to 210 with at least 5 weight percent of predominantly or exclusively terminal oxyethylene blocks mixed with reaction products prepared from ethylene glycol and 0.1 to 0.5 moles of propylene oxide. European Patent A 96 231 discloses glycol chain extending agents with mixtures of certain polyoxypropylene polyoxyethylene polyols with at least 23 weight percent of ethylene oxide radicals which are completely miscible.

However, none of the aforesaid methods lead to technically satisfactory results since the mixtures have limited storage stability and/or since the polyol components having the necessary above-described molecular structure strongly restrict the ability to vary certain system properties.

Federal Republic of Germany Patent Application P 38 24 055.6 discloses a method for overcoming the aforesaid disadvantage by preparing homogeneous mixtures of incompatible polyols by introducing a mixture of nonionic and ionic solubilizers into the polyol mixture.

The Federal Republic of Germany 37 18 935 (U.S. Pat. No. 4,673,696) discloses storage stable mixtures of a long chain polyol and a short chain diol which also includes an ethylenically unsaturated ester alcohol to prevent phase separation normally occurring during storage.

Federal Republic of Germany 22 44 350 (U.S. Pat. No. 3,746,663) discloses a process for the preparation of polyurethane foam from conventional starting materials in which a mixture is used as a cell stabilizer which is obtained by the polymerization of N-vinylpyrrolidone, a mixture of N-vinylpyrrolidone and dibutyl maleate or a mixture of N-vinylpyrrolidone, dibutylmaleate and vinyl acetate in certain quantity ratios in a liquid polyether polyol having 2 to 8 hydroxyl groups and a molecular weight of 150 to 6500.

Similar stabilizers are disclosed in U.S. Pat. No. 3,914,188. The polymer acting as the stabilizer is prepared as a polyoxyalkylene with capped terminal groups inert to isocyanate groups by the polymerization of N-vinyllactams having the following formula:

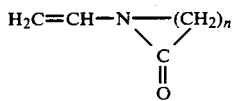

in which N is 3 to 5, or by the copolymerization of the aforesaid N-vinyllactams with an ester of an unsaturated dicarboxylic acid having 4 or 5 carbon atoms.

U.S. Pat. No. 4,529,745 discloses polymers used as foam stabilizers for polyurethane and polyisocyanurate foams which are prepared from unsaturated polyoxyalkylene adducts and unsaturated dicarboxylic acid esters by graft polymerization in the presence of free radical forming initiators whereby fumaric acid diester is used as the unsaturated dicarboxylic acid diester in such quantities so that at least 75 weight percent of the unsaturated dicarboxylic acid diesters are grafted. The unsaturated polyoxyalkylene adducts are capped before or after graft polymerization to reduce the hydroxyl number to less than 50 using suitable compounds.

Federal Republic of Germany 16 94 432 (U.S. Pat. No. 3,484,392) discloses mixed polymers used as additives to control cell size in the preparation of polyurethane foams which are obtained by the copolymerization of an unsaturated compound A and at least one derivative B of a mono or diprotic unsaturated acid which is copolymerizable with compound A, whereby one or both compounds A and B contain one or more aliphatic substituents having at least 4 carbon atoms in bonded form, and at least one of compounds A and B has one or more polyoxyalkylene radicals which contains as a terminal group an alkyl, aryl, aralkyl or acryl group.

Since polyoxyalkylene terminal groups are basically inert to isocyanate groups, they are suitable as stabilizers in the preparation of storage stable mixers with polyisocyanates.

These typical silicon free stabilizers allow for the preparation of polyurethane and polyisocyanurate foams having surfaces which are better able to be coated, painted and bonded to. Also improved is the flame resistance of the foams. A disadvantage of the silicon free stabilizers compared to organo-silicon stabilizers deals with the decreased solubility of CFC's as blowing agents in the foam formulation which brings about an impairment in the insulation effect of the foam formed.

Federal Republic of Germany 37 24 717 discloses copolymers as foam stabilizers for improving the flame resistance and insulation effect of polyurethane and polyisocyanurate foams which comprise a) vinyl monomers based on vinyl carboxylates, esters of acrylic and methacrylic acid or vinyl pyrrolidone and b) allyl or methylylpolyoxyalkylene ethers having an average molecular weight of from 400 to 5000 in a mole ratio of a:b of the monomers of from 1:1 to 10:1.

A disadvantage of these copolymer stabilizers lies in the difficultly in obtaining methallylpolyoxyalkylene ethers which can form explosive ether peroxides if handled improperly. Another disadvantage is the relatively simple formation of crosslinked byproducts in their preparation. In addition, there was an urgent technical interest for homogeneous storage stable formulations for polyisocyanate addition polymerization products made from incompatible higher molecular weight polyols and lower molecular weight chain extending agents and/or crosslinking agents or storage stable dispersions of solids and polyols as well as optionally catalysts, blowing agents, auxiliaries and/or additives which even in long term storage had no tendency toward phase separation and/or sedimentation and which could completely or at least partially overcome the aforesaid disadvantages.

The object of the present invention was to develop polymers or copolymers which were suitable as dispersing agents and/or emulsifiers for formulations for the preparation of polyisocyanate addition polymerization products. This object was surprisingly met by the novel copolymers of the present invention.

The subject of the invention is copolymers having a K-value of from 5 to 80, more preferably 8 to 60 and most preferably 10 to 40 and especially 12 to 30 measured as a 0.5 weight percent solution in isopropanol at 25° C. (according to Fikentscher, *Cellulose Chemistry*, 13, 1932, pg. 58) which are prepared in the presence of polymerization initiators by the radical polymerization of:

A) 20 to 80 weight percent, more preferably 25 to 70 weight percent, and most preferably 30 to 55 weight percent based on the total weight of monomers A and B of at least one olefinic unsaturated polyoxyalkylene alcohol adduct or polyester B) 80 to 20 weight percent, more preferably 75 to 30 weight percent, and most preferably 70 to 45 weight percent based on the total weight of monomers A and B of at least one vinyl monomer selected from the group consisting of N-vinylformamide, N-vinyl-2-pyrrolidone, N-vinyl-2-piperidone, N-vinyl-2-caprolactam, N-vinylimidazole, N-vinyl-2-ethyleneurea and N-vinyl-2-propyleneurea;

C) 0.05 to 40 weight percent, more preferably 0.1 to 40 weight percent, and most preferably 2.5 to 30 weight percent, based on 100 parts by weight of monomers A and B of glycidyl acrylate, glycidyl methacrylate or mixtures thereof;

D) 0 to 10 parts by weight, more preferably 0.1 to 10 parts by weight, and most preferably 1 to 7.5 parts by weight based on 100 parts by weight of monomers A and B of at least $\alpha\beta$-monoolefinic unsaturated acid; and E) 0 to 30 parts by weight, more preferably 0.1 to 25 parts by weight, and most preferably 5 to 20 parts by weight based on 100 parts by weight of monomers A and B of at least one olefinic unsaturated carboxylic acid amide and/or ester and/or styrene.

According to a preferred embodiment, said copolymers comprise:

A) 20 to 80 weight percent, more preferably 30 to 55 weight percent, based on the total weight of A and B, of monomer A;

B) 80 to 20 weight percent, more preferably 70 to 45 weight percent, based on the total weight of A and B, of monomer B;

C) 0.05 to 40 parts by weight, more preferably -0.1 to 40 parts by weight, based on 100 parts by weight of monomers A and B, of monomer C;

D) 0.1 to 10 parts by weight, more preferably 1 to 7.5 parts by weight, based on 100 parts by weight of monomers A and B, of an olefinic unsaturated acid D selected from the group consisting of acrylic acid, methacrylic acid, maleic acid, fumaric acid, itaconic acid, vinylsulfonic acid and vinylphosphonic acid; and E) 0 to 30 parts by weight, more preferably 0.1 to 25 parts by weight, based on 100 parts by weight of monomers A and B, of monomer E.

The subject of the invention is also using said copolymers as dispersing auxiliaries and/or emulsifiers in formulations for preparing polyisocyanate addition polymerization products, or using said copolymers as additives for improving the mechanical properties of polyisocyanate addition polymerization products of claims 6–8, and in addition a subject of the present invention is a process for the preparation of polyisocyanate addition polymerization products in the presence of these novel copolymers.

Said copolymers basically contain copolymerized units of olefinic unsaturated polyoxyalkylene alcohol adducts or polyester alcohol adducts (A), vinyl monomers (B) and glycidyl methacrylates (C). By adding monomers (D) as well as optionally (E) said copolymers can be modified and in this manner their use can be tailored to special requirements. For example, said copolymers when comprising basically units of monomers (A) through (C), as well as (E) in bonded form are particularly suitable as dispersing agents for the preparation of stable solid polyol dispersions for polyurethane flexible and polyurethane rigid foams or as emulsifiers for forming stable emulsions of internal mold release agents in polyols for non-cellular and cellular polyurethane elastomers or as an additive for minimizing shrinkage of polyurethane elastomers or foams. Copolymers comprising polymerized units of monomers (A) through (D) respectively, as well as optionally (E), have been found to be suitable, on the other hand, particularly for use as dispersing agents in the preparation of stable dispersions of powdered solids, for example, melamine in room temperature liquid polyols for polyurethane rigid foams and polyurethane flexible foams.

The novel copolymers have an advantage in that they may be used in a broad range of applications and in theory they pose no restrictions on selecting starting materials for forming formulations and/or polyaddition polymerization products prepared from them which is typically the case in the state of the art following most homogenization processes. The mechanical properties of the end products prepared when properly using said copolymers as dispersing agents and/or emulsifiers are positively influenced. Surprisingly, when adding larger amounts, i.e., more than 3 weight percent based on the weight of the higher molecular weight polyols, especially the shrinkage of polyisocyanate addition polymerization articles is minimized. Also worth mentioning is the improved flame resistance of polyurethane flexible foams. Moreover, the density of polyurethane flexible foams can be minimized to a certain degree without impairing the mechanical property level of the foams. Also worth mentioning is the improved flow behavior of the dispersions of at least one powdered solid, particularly melamine and the room temperature liquid polyether polyols and/or polyester polyols. When used with aromatic, preferably difunctional polyisocyanates, they generate polyurethane flexible foams having an improved cell structure, improved mechanical properties, increased flammability and lower densities.

The following should be noted with respect to the olefinic unsaturated monomers (A) through (E) in the preparation of said novel copolymers and with respect to starting components (a) through (f) for the preparation of said polyisocyanate addition polymerization products:

As previously mentioned, said novel copolymers comprise as basic components polymerized units of olefinic unsaturated polyoxyalkylene alcohol adducts or polyester alcohol adducts (A), selected vinyl monomers (B) and glycidyl methacrylates (C), as well as, depending on the type of application, polymerized units of one or more of monomers D and/or E.

A. The following monomers having structural formulas (I) through (VIII) are suitable as said olefinic unsaturated polyoxyalkylene alcohol adducts or polyester alcohol adducts (A):

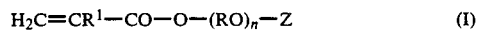

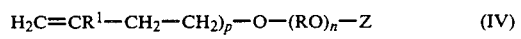

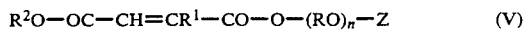

-continued

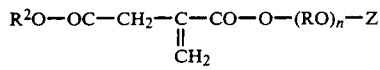

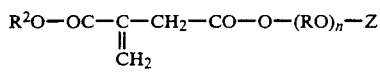

and

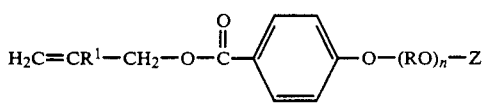

in which $R^1$ and $R^2$ are each hydrogen or a linear or branched alkyl group having 1 to 4 carbon atoms, for example, methyl, ethyl, n- or isopropyl, n- or sec-butyl whereby radicals $R^1$ and $R^2$ can be the same or different and $R^1$ is preferably hydrogen or methyl and $R^2$ is preferably hydrogen, methyl, or ethyl;

R is the same or different bridge members having the following formula: $—CH_2CH_2—$, $—CH_2—CH(CH_3)—$,

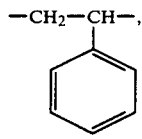

$—CH_2CH_2CH_2CH_2—$ or $—CO—(CH_2)m—O—$, whereby m is a whole number of from 1 to 10, preferably 2 to 6;

Z is hydrogen, a linear or branched alkyl radical having 1 to 24 carbon atoms, more preferably 4 to 18 carbon atoms, a linear or branched fluoro-substituted alkyl radical having 1 to 24 carbon atoms, more preferably 4 to 18 carbon atoms in which the hydrogen atoms are completely o preferably partially substituted by fluorine atoms; an aryl radical; preferably a phenyl group or an alkyl substituted aryl radical; preferably a phenyl group substituted preferably by a $C_1$–$C_{24}$-alkyl radical, more preferably a $C_4$–$C_{18}$-alkyl radical, such as, for example, p-nonyl, p-decyl or dodecylphenyl;

n is a whole number of from 2 to 200, more preferably 10 to 100, and p is a whole number of from 1 to 18, more preferably 1 to 10.

$(RO)_n$- are accordingly units of polymerized styrene oxide, tetrahydrofuran, 1,2-propylene oxide or ethylene oxide or mixed units of the alkylene oxides, whereby the units can be in bonded form either statistically or in block fashion and can have different degrees of alkoxylation. Preferably used are polyoxyethylene units, polyoxypropylene units and polyoxypropylene-polyoxyethylene units. Polymerized caprolactones are also suitable as $(RO)_n$-.

To form the olefinic unsaturated polyoxyalkylene alcohol adduct or polyester alcohol adduct (A), monofunctional aliphatic, cycloaliphatic, heterocyclic and/or aromatic hydroxyl compounds, such as, for example, linear or branched optionally fluorinated alcohols, phenols and/or alkylphenols can be oxyalkylated and then the corresponding polyoxyalkylene glycols or polyester diols be esterified or transesterified with olefinic unsaturated mono or dicarboxylic acids or their derivatives, such as, for example, anhydrides, mono and/or dialkyl esters, in corresponding mole ratios. According to another method the olefinic unsaturated monocarboxylic acids, or the monoesters of olefinic unsaturated dicarboxylic acids, the corresponding carboxylic acid amides or olefinic unsaturated, optionally fluorinated, alcohols, such as, for example, 2-methylbutanol can be alkoxylated, more preferably ethoxylated and/or propoxylated and then the terminal hydroxyl groups can optionally be etherified, for example, with alkyl halides. Typical olefinic unsaturated dicarboxylic acids or alcohols are preferably acrylic acid, methacrylic acid, maleic acid, fumaric acid, itaconic acid and monoalkyl esters of the aforesaid dicarboxylic acids and 2-methylbutanol. Most preferably the olefinic unsaturated adducts (A) have NCO group reactive radicals, most preferably hydroxyl groups. They can be used individually or in the form of mixtures.

B. Typical vinyl monomers (B) are: N-vinylformamide, N-vinyl-2-pyrrolidone, N-vinyl-2-piperidone, N-vinyl-2-caprolactam, N-vinylimidazole, N-vinyl-2ethylene urea and N-vinyl-2-propylene urea. Having been successfully proven and therefore most preferably used is N-vinylpyrrolidone. The N-vinyl monomers (B), just as monomers (A) can be used individually or as mixtures.

C. Glycidyl acrylate, glycidyl methacrylate, or mixtures of both are used as monomer (C).

D. In addition to the aforementioned glycidyl methacrylates (C), however, depending on the use: of said copolymers, as an addition monomer (D) one can use: at least one $\alpha\beta$-monoolefinic unsaturated acid, preferably a mono and/or dicarboxylic acid having 3 to 6 carbon atoms and/or the monoalkyl esters of 4 to 6 carbon atoms containing dicarboxylic acids having 1 to 24 carbon atoms, more preferably 4 to 8 carbon atoms containing linear or branched alkanols. The corresponding anhydrides can be used in place of the dicarboxylic acids or mixed with them. Typical acids are, for example: olefinic unsaturated sulfonic acids or phosphoric acids, preferably vinyl sulfonic acid or vinyl phosphonic acid, mono or dicarboxylic acids, for example, crotonic acid, preferably acrylic acid, methacrylic acid, maleic acid, fumaric acid and itaconic acid: carboxylic acid anhydrides, for example, maleic acid anhydride, itaconic acid anhydride and methacrylic acid anhydride; and monoalkyl esters of dicarboxylic acid: such as, for example, monomethyl maleate, monobutylmaleate, mono-2-ethyl-hexylmaleate, monoisoamyl maleate, monoisooctyl maleate or monostearyl maleate.

If monomers (D) are used, then as already stated, they can be used individually or in the form of mixtures.

E. In the preparation of said novel copolymers, styrene and/or olefinic unsaturated carboxylic acid amides and/or carboxylic acid esters can optionally be used as an additional monomer whereby preferably used are carboxylic acid vinyl esters and/or the amides and esters of acrylic acid and methacrylic acid. Typical examples are: N,N-dialkylacrylamides, dialkylmethacrylamides, N-alkylacrylamides and N-alkylmethacrylamides having 1 to 12 carbon atoms, more preferably 1 to 4 carbon atoms in the alkyl radical, such as, for example, N,N-dimethyl-, N,N-diethyl-, N,N-diisopropyl-, N,N-dibutyl(meth)acrylamide, N-methyl-, N-(n-propyl)-, N-isopropyl-, N-t-butyl-, N-t-hexyl-, N-cyclohexyl-, N-t-octyl- and N-1-methylundecyl(meth)acrylamide, N-benzyl(meth)acrylamide, acrylamide and methacrylamide; carboxylic acid vinyl esters having 1 to 20 carbon atoms, more preferably 2 to 8 carbon atoms in the alkanol radical, such as, for example, vinyl acetate, vinyl propionate, vinyl-2-ethylhexanoate, vinyl laurate and vinyl stearate; alkylacrylates and/or alkylmethacrylates having 1 to 24 carbon atoms, more preferably 1 to 18 carbon atoms in the alkyl radical, such as, for example: methyl-, ethyl-, n-propyl-, isopropyl, n-, iso- and t-butyl, 2-ethylhexyl-, amyl-, isoamyl-, isooctyl-, decyl-, lauryl-, stearylacrylate and/or -methacrylate, as well as cyclohexylacrylate and/or -methacrylate, hydroxyalkylacrylates and -meth-acrylates having 2 to 10 carbon atoms, more preferably 2 to 6 carbon atoms in the hydroxyalkyl radicals, such as, for example: hydroxyethyl-, 2-hydroxypropyl- and 4-hydroxybutyl acrylate, and/or -methacrylate, N,N-dialkylaminoalkyl (meth)-acrylates, such as, for example, N,N-diethylaminoethyl methacrylate and N,N-dimethylaminoethyl methacrylate, as well as N-methylolether(meth)-acrylamides having 1 to 20 carbon atoms in the linear or branched methylolether radical.

The copolymers of this invention can be prepared by means of substance, solution or emulsion polymerization while using suitable polymerization initiators. Such polymerization processes are known and are disclosed in, for example, European Patent A 0 039 797, European Patent A 003 516 (U.S. Pat. No. 4,250,070) and in Federal Republic of Germany 25 26 747 (Great Britain 1 546 144) so that the copolymers can be obtained analogous to the preparation processes described therein. Copolymerization in solution is preferred.

Conventional solvents can be used for solution copolymerization, such as, for example, hydrocarbons such as benzene, toluene, o-, m-, p-xylene, ethylbenzene, benzynes, n-hexane, cyclohexane; esters, such as ethyl acetate; alcohols such as ethanol, methanol, isopropanol; ethers such as dioxane, tetrahydrofuran, as well as mixtures of the aforesaid solvents.

The amount of polymerization initiator generally is from 0.01 to 7 weight percent based on the total of the weights of monomers (A) and (B).

Typical polymerization initiators are, for example, 2,2'-azobisisobutyronitrile (Porofor ® N), 2,2'-dimethylazobisisobutyrate (V 601 from the Wako Co.), 4,4'-azobis(4-cyanovaleric acid); peresters; such as, for example, t-butylperpivalate, t-butylperoctoate, t-butylperbenzoate; peroxides, such as, for example, dibenzoyl peroxide and dilauroyl peroxide; hydroperoxides, such as, for example, cumolhydroperoxides, as well as peroxydicarbonates, such as dicyclohexylperoxy dicarbonates; ketone peroxides, such as methylethylketone peroxide and cyclohexanone peroxide.

The aforesaid initiators can be used individually or jointly.

When conducting the copolymerization, compounds can be added to the reaction mixture which lower the degree of polymerization. Typical compounds are mercaptans, such as mercaptoethanol, mercaptosuccinic acid, mercaptopropionic acid, mercaptoglycerin, 3-mercaptopropyltrimethoxysilane, 3-mercaptopropylmethyldimethoxysilane; benzene derivatives, such as isopropylbenzene, diisopropylbenzene, isopropylbenzeldahyde; or ketones, such as, for example, methylisopropyl ketone. The polymerization regulators are used in quantities of from 0 to 10 weight percent based on the total of the weights of monomers (A) and (B).

The copolymers of the present invention are preferably prepared without using any of the above mentioned polymerization regulators.

When carrying out the copolymerization in solution, generally a portion or all of the solvent is heated with a portion or all of the monomeric mixture and a portion or all of the polymerization initiator. The beginning of the copolymerization is delayed and the remainder of the monomeric mixture and optionally the remainder of the polymerization initiator and optionally even solvent are then added. The copolymerization occurs efficaciously in a higher concentrated solution preferably with monomeric concentrations of greater then 40 weight percent, more preferably greater then 65 weight percent, and most preferably greater then 80 weight percent based on the total weight of the reaction mixture.

The copolymerization generally is done at temperatures of from 50° to 230° C., more preferably 70° to 120° C. under normal pressure or increased pressure, for example 1 to 100 bar, more preferably 1 to 15 bar.

After completing copolymerization the solvent or solvent mixture is distilled off at an increased temperature to isolate said copolymers. Solvent residues, and optionally, other volatile components are separated under reduced pressure, for example, 500 to 20 mbar at temperatures of from 80° to 150° C. Separating solvent and volatile components can occur directly from the polymerization vessel. However, the copolymer solution, optionally following concentrating, can be added to a degassing vessel and degassed there.

According to another method, after complete copolymerization of the reaction mixture one can incorporate selected starting components for the preparation of a polyisocyanate addition polymerization product and thereafter remove the solvent and optionally volatile components; for example, by fractional distillation.

The novel copolymers are used as dispersing agents and/or emulsifiers in formulations or mixtures thereof are used, for example, in the (A) and/or (B) components for the preparation of polyisocyanate addition polymerization products and/or as additives for improving mechanical properties of polyisocyanate addition polymerization products prepared from these formulations. The copolymers are also suitable as additives in formulations for preparing practically shrinkage free molded articles based on urethane group, or urethane and urea group containing elastomers or foams.

The copolymers are also used as dispersing auxiliaries in the preparation of storage stable dispersions of at least one powdered solid, preferably melamine and at least one polyester polyol and/or polyether polyol liquid at 25° C.

For the preparation of the polyisocyanate addition polymerization products one reacts the following together in a conventional fashion:

a) organic polyisocyanates and/or modified organic polyisocyanates with;

b) higher molecular weight compounds having at least 2 reactive hydrogen atoms and with or without;

c) chain extending agents and/or crosslinking agents in the presence of;

d) catalysts;

e) auxiliaries and/or additives; as well as in the presence of or absence of;

f) blowing agents.

According to the present invention, here the novel copolymers of one of claims 1 through 5 are used as said auxiliary and/or additive (e).

The following should be noted with respect to starting components (a) through (f) for the preparation of non-cellular polyisocyanate addition polymerization products, preferably urethane or urethane and isocyanurate group containing foams, or cellular or non-cellular urethane, urea, or urethane and urea group containing elastomers:

a) the organic polyisocyanates may include all essentially known aliphatic, cycloaliphatic, araliphatic and preferably aromatic multivalent isocyanates.

Specific examples include: alkylene diisocyanates with 4 to 12 carbons in the alkylene radical such as 1,12-dodecane diisocyanate, 2-ethyl-1,4-tetramethylene diisocyanate, 2-methyl-1,5-pentamethylene diisocyanate, 1,4-tetramethylene diisocyanate and preferably, 1,6-hexamethylene diisocyanate; cycloaliphatic diisocyanates such as 1,3- and 1,4-cyclohexane diisocyanates as well as any mixtures of these isomers, 1-isocyanato-3,3,5-trimethyl-5-isocyanatomethylcyclohexane (isophorone diisocyanates), 2,4- and 2,6-hexahydrotoluene diisocyanate as well as the corresponding isomeric mixtures, 4,4'-, 2,2'-, and 2,4'-dicyclohexylmethane diisocyanate as well as the corresponding isomeric mixtures and preferably aromatic diisocyanates and polyisocyanates such as 2,4- and 2,6-toluene diisocyanate and the corresponding isomeric mixtures, 4,4'-, 2,4'-, and 2,2'-diphenylmethane diisocyanates and the corresponding isomeric mixtures, mixtures of 4,4'- and 2,4'-diphenylmethane diisocyanates and polyphenyl-polymethylene polyisocyanates (polymeric MDI) as well as mixtures of polymeric MDI and toluene diisocyanates. The organic di- and polyisocyanates can be used individually or in the form of mixtures.

Frequently, so-called modified multivalent isocyanates, i.e., products obtained by chemical reaction of organic diisocyanates and/or polyisocyanates, are used. Examples include diisocyanates and/or polyisocyanates containing ester groups, urea groups, biuret groups, allophanate groups, carbodiimide groups, isocyanurate groups, uretdione groups and/or urethane groups.

Specific examples include organic, preferably aromatic polyisocyanates containing urethane groups and having an NCO content of 33.6 to 15 weight percent, preferably 31 to 21 weight percent, based on the total weight, e.g., with low molecular weight diols, triols, dialkylene glycols, trialkylene glycols or polyoxyalkylene glycols with a molecular weight of up to 800; modified 4,4'-diphenylmethane diisocyanates or 2,4- and 2,6-toluene diisocyanates, whereby examples of di- and polyoxyalkylene glycols that may be used individually or as mixtures, include diethylene glycol, dipropylene glycol, polyoxyethylene glycol, polyoxypropylene glycol and polyoxypropylene polyoxyethylene glycol. Prepolymers containing NCO groups with an NCO content of 25 to 9 weight percent, preferably 21 to 14 weight percent, based on the total weight and prepared from the polyester polyols and/or preferably polyether polyols described below and 4,4'-diphenylmethane diisocyanate, 2,4- and/or 2,6-toluene diisocyanates or polymeric MDI are also suitable. Furthermore, liquid polyisocyanates containing carbodiimide groups and/or isocyanurate rings and having an NCO content of 33.6 to 15 weight percent, preferably 31 to 21 weight percent, based on the total weight, are also suitable, e.g., based on 4,4'- and 2,4'- and/or 2,4' and/or 2,6-toluene diisocyanate.

The modified polyisocyanates may optionally be mixed together or mixed with unmodified organic polyisocyanates such as 2,4- and 4,4'-diphenylmethane diisocyanate, polymeric MDI, 2,4- and/or 2,6-toluene diisocyanate.

The following have proven especially successful as organic polyisocyanates and are preferred for use in the preparation of cellular elastomers: prepolymers containing NCO groups and having an NCO content of 25 to 9 weight percent, especially those based on polyether polyols or polyester polyols and one or more diphenylmethane diisocyanate isomers, preferably 4,4'-diphenylmethane diisocyanate, and/or modified organic polyisocyanates containing urethane groups and having an NCO content of 33.6 to 15 weight percent, especially those based on 4,4'-diphenylmethane diisocyanate or diphenylmethane diisocyanate isomeric mixtures; for the preparation of flexible polyurethane foams: mixtures of 2,4- and 2,6-toluene diisocyanates, mixtures of toluene diisocyanates and polymeric MDI or especially mixtures of the aforementioned prepolymers based on diphenylmethane diisocyanate isomers and polymeric MDI; and for the production of polyurethane rigid foams or polyurethane polyisocyanurate rigid foams: polymeric MDI.

b) Preferred higher molecular weight compounds b) having at least two reactive hydrogens include those with a functionality of 2 to 8, preferably 2 to 4, and a molecular weight of 800 to 8000, preferably 1200 to 6000. For example, polyether polyamines and/or preferably polyols selected from the group consisting of polyether polyols, polyester polyols, polythioether polyols, polyester amides, polyacetals containing hydroxyl groups, aliphatic polycarbonates containing hydroxyl groups, and mixtures of at least two of the aforementioned polyols have proven suitable. Polyester polyols and/or polyether polyols are preferred. Suitable polyester polyols can be produced, for example, from organic dicarboxylic acids with 2 to 12 carbons, preferably aliphatic dicarboxylic acids with 4 to 6 carbons, and multivalent alcohols, preferably diols, with 2 to 12 carbons, preferably 2 to 6 carbons. Examples of dicarboxylic acids include succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids can be used individually or in mixtures. Instead of the free dicarboxylic acids, the corresponding dicarboxylic acid derivatives may also be used such as dicarboxylic acid esters of alcohols with 1 to 4 carbons or dicarboxylic acid anhydrides. Dicarboxylic acid mixtures of succinic acid, glutaric acid and adipic acid in a quantity ratio of 20–35:35–50:20–32 parts by weight are preferred, especially adipic acid. Examples of divalent and multivalent alcohols, especially diols, include ethanediol, diethylene glycol, 1,2- and 1,3-propanediol, dipropylene glycol, 1,4-butanediol, 1,5-pentanediol, 1,6-hexanediol, 1,10-decanediol, glycerol and trimethylolpropane. Ethanediol, diethylene glycol, 1,4-butanediol, 1,5-pentanediol, 1,6-hexanediol, or mixtures of at least two of these diols are preferred, especially mixtures of 1,4-butanediol, 1,5-pentanediol and 1,6-hexanediol. Furthermore, polyester polyols of lactones, e.g., $\epsilon$-caprolactone or hydroxycarboxylic acids, e.g., $\omega$-hydroxycaproic acid, may also be used.

The polyester polyols can be produced by polycondensation of organic polycarboxylic acids, e.g., aromatic or preferably aliphatic polycarboxylic acids and/or derivatives thereof and multivalent alcohols in the absence of catalysts or preferably in the presence of esterification catalysts, preferably in an atmosphere of inert gases, e.g., nitrogen, carbon monoxide, helium, argon, etc., in the melt at temperatures of 150° to 250° C., preferably 180° to 220° C., optionally under reduced pressure, up to the desired acid value, which is preferably less than 10, especially less than 2. In a preferred embodiment, the esterification mixture is subjected to polycondensation at the temperatures mentioned above up to an acid value of 80 to 30, preferably 40 to 30, under normal pressure and then under a pressure of less than 500 mbar, preferably 50 to 150 mbar. Examples of suitable esterification catalysts include iron, cadmium, cobalt, lead, zinc, antimony, magnesium, titanium and tin catalysts in the form of metals, metal oxides or metal salts. However, polycondensation may also be performed in liquid phase in the presence of solvents and/or entraining agents such as benzene, toluene, xylene or chlorobenzene for azeotropic distillation of the water of condensation.

To produce the polyester polyols, the organic polycarboxylic acids and/or derivatives thereof and multivalent alcohols are preferably polycondensed in a mole ratio of 1:1–1.8, preferably 1:1.05–1.2.

The resulting polyester polyols preferably have a functionality of 2 to 4, especially 2 to 3, and a molecular weight of 800 to 3000, preferably 1200 to 3000 and especially 1800 to 2500.

However, polyether polyols, which can be obtained by known methods, are especially preferred for use as the polyols. For example, polyether polyols can be produced by anionic polymerization with alkali hydroxides such as sodium hydroxide or potassium hydroxide or alkali alcoholates, such as sodium methylate, sodium ethylate or potassium ethylate or potassium isopropylate as catalysts and with the addition of at least one initiator molecule containing 2 to 8, preferably 2 to 4, reactive hydrogens or by cationic polymerization with Lewis acids such as antimony pentachloride, boron trifluoride etherate, etc., or bleaching earth as catalysts from one or more alkylene oxides with 2 to 4 carbons in the alkylene group.

Suitable alkylene oxides include, for example, tetrahydrofuran, 1,3-propylene oxide, 1,2- and 2,3-butylene oxide, styrene oxide and preferably ethylene oxide and 1,2-propylene oxide. The alkylene oxides may be used individually, in alternation, one after the other or as a mixture. Examples of suitable initiator molecules include water, organic dicarboxylic acids such as succinic acid, adipic acid, phthalic acid and terephthalic acid, aliphatic and aromatic, optionally N-mono-, N,N-, and N,N'-dialkyl substituted diamines with 1 to 4 carbons in the alkyl groups such as optionally mono- and dialkyl-substituted ethylenediamine, diethylenetriamine, triethylenetetramine, 1,3-propylenediamine, 1,3-and 1,4-butylenediamine, 1,2-, 1,3-, 1,4-, 1.5-and 1,6-hexamethylenediamine, phenylenediamines, 2,3-, 2,4- and 2,6-toluenediamine and 4,4'-, 2,4'-and 2,2'-diaminodiphenylmethane.

Suitable initiator molecules also include alkanolamines such as ethanolamine, diethanolamine, N-methyl- and N-ethylethanolamine, N-methyl- and N-ethyldiethanolamine and triethanolamine plus ammonia. Multivalent alcohols, especially divalent and/or trivalent alcohols are preferred such as ethanediol, 1,2-propanediol and 1,3-propanediol, diethylene glycol, dipropylene glycol, 1,4-butanediol, 1,6-hexanediol, glycerol, trimethylolpropane, pentaerythritol, sorbitol and sucrose.

The polyether polyols have a functionality of preferably 2 to 6 and especially 2 to 4 and have a molecular weight of 800 to 8000, preferably 1200 to 6000 and especially 1800 to 4000.

Suitable polyether polyols also include graft polyether polyols, preferably those based on styrene and/or acrylonitrile, which are produced by in situ polymerization of acrylonitrile, styrene or preferably mixtures of styrene and acrylonitrile, e.g., in a weight ratio of 90:10 to 10:90, preferably 70:30 to 30:70, preferably in the aforementioned polyether polyols according to the procedures described in Federal Republic of Germany Patents, 1 111 394, 1 222 669 (U.S. Pat. Nos. 3,304,273, 3,383,351, 3,523,093), 1 152 536 (Great Britian Patent 1 040 452) and 1 152 537 (Great Britain Patent 987 618). In place of the aforesaid polyether polyols and/or graft polyether polyols other polymer modified polyether polyols or mixtures of polyether polyols and polymer modified polyether polyols may be used. Typical polymer modified polyether polyols contain efficaciously 2 to 50 weight percent, more preferably 3 to 25 weight percent based on the total weight of inorganic fillers, such as, for example, kaolin or aluminum oxide; organic fillers, such as, for example, carbon black, colophony, melamine, cyanuric acid derivatives or polymer particles whereby the polymer particles preferably are selected from the group consisting of polyureas, polyhydrazide, tertiary amino group containing polyurethanes, polyolefins, polyacrylonitriles and polyvinylchlorides. Such polymer modified polyether polyols and processes for their preparation are disclosed, for example, in European Patent 0 011 752 (U.S. Pat. No. 4,304,708) U.S. Pat. No. 4,374,209 and Federal Republic or Germany 32 31 497. Like the polyester polyols, the polyether polyols may be used either individually or in the form of mixtures. Furthermore, they can be mixed with the graft polyether polyols or polyester polyols as well as the polyester amides containing hydroxyl groups, the polyacetals, polycarbonates and/or polyether polyamines.

Examples of hydroxyl group-containing polyacetals that can be used include, for example, the compounds that can be produced from glycols such as diethylene glycol, triethylene glycol, 4,4'-dihydroxyethoxydiphenyldimethylethane, hexanediol and formaldehyde. Suitable polyacetals can also be produced by polymerization of cyclic acetals.

Suitable hydroxyl group-containing polycarbonates include those of the known type such as those obtained by reaction of diols, e.g., 1,3-propanediol, 1,4-butanediol and/or 1,6-hexanediol, diethylene glycol, triethylene glycol or tetraethylene glycol and diaryl carbonates, e.g., diphenyl carbonate, or phosgene.

The polyester amides include the mainly linear condensates obtained from multivalent saturated and/or unsaturated carboxylic acids and their anhydrides and multivalent saturated and/or unsaturated amino alcohols or mixtures of multivalent alcohols and amino alcohols and/or polyamines.

Suitable polyether polyamines can be produced from the polyether polyols mentioned above by known methods. Examples include cyanoalkylation of polyoxyalkylene polyols and subsequent hydrogenation of the nitrile thus formed (U.S. Pat. No. 3,267,050) or partial or complete amination of polyoxyalkylene polyols with amines or ammonia in the presence of hydrogen and catalysts (Federal Republic of Germany Patent 1 215 373).

c) The polyisocyanate addition polymerization products and preferably said foams and non-cellular or cellular elastomers can be prepared with or without using chain extending agents and/or crosslinking agents. To modify the mechanical properties., e.g., hardness, however, it has proven advantageous to add chain extenders, crosslinking agents or optionally even mixtures thereof. Suitable chain extenders and/or crosslinking agents include diols and/or triols with molecular weights of less than 400, preferably 60 to 300. Examples include aliphatic, cycloaliphatic and/or araliphatic diols with 2 to 14 carbons, preferably 4 to 10 carbons, such as ethylene glycol, 1,3-propanediol, 1,10-decanediol, o-, m- and p-dihydroxycyclohexane, diethylene glycol, dipropylene glycol and preferably 1,4butanediol, 1,6-hexanediol and bis(2-hydroxyethyl)hydroquinone; triols such as 1,2,4- and 1,3,5-trihydroxycyclohexane, glycerol and trimethylolpropane; and low molecular weight hydroxyl group-containing polyalkylene oxides based on ethylene oxide and/or 1,2-propylene oxide and the aforementioned diols and/or triols as initiator molecules.

In addition to the aforementioned diols and/or triols, or in a mixture with them as chain extenders or crosslinking agents to prepare the cellular polyurethane-polyurea-elastomers, it is also possible to use secondary aromatic diamines, primary aromatic diamines, 3,3'-di- and/or 3,3'-, 5,5'-tetraalkyl-substituted diaminodiphenylmethanes.

Examples of secondary aromatic diamines include N,N'-dialkyl-substituted aromatic diamines, which may optionally be substituted on the aromatic ring by alkyl groups, where there are 1 to 20, preferably 1 to 4 carbons in the N-alkyl group such as N,N'-diethyl-, N,N'-di-sec-pentyl-, N,N'-di-sechexyl-, N,N'-di-sec-decyl-, N,N'-dicyclohexyl-p-or -m-phenylenediamine; N,N'-dimethyl-, N,N'-diethyl-, N,N'-diisopropyl-, N,N'-di-sec-butyl-, N,N'-dicyclohexyl-4,4'- diaminodiphenylmethane and N,N'-di-sec-butylbenzidine.

The preferred aromatic diamines are those having at least one alkyl substituent in ortho position to the amino groups and they are liquid at room temperature and are miscible with component (b), especially the polyether polyols. Furthermore, alkyl-substituted meta-phenylenediamines of the following formulas have also proven successful:

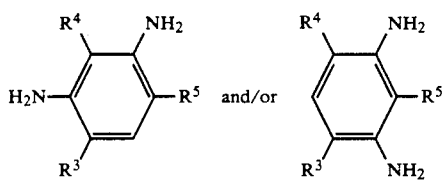

where $R^3$ and $R^4$ may be the same or different and denote a methyl group, as propyl group, and an isopropyl group, and $R^5$ is a linear or branched alkyl group with 1 to 10 carbons, preferably 4 to 6 carbons. Alkyl groups $R^5$ in which the branching site is on the $C^1$ carbon are especially suitable. Examples of $R^5$ groups include methyl, ethyl, isopropyl, 1-methyloctyl, 2-ethyloctyl, 1-methylhexyl, 1,1-dimethylpentyl, 1,3,3-trimethylhexyl, 1-ethylpentyl, 2-ethylpentyl and preferably cyclohexyl, 1-methyl-n-propyl, t-butyl, 1-ethyl-n-propyl, 1-methyl-n-butyl and 1,1-dimethyl-n-propyl.

Examples of alkyl-substituted m-phenylenediamines include especially: 2,4-dimethyl-6-cyclohexyl-1,3-phenylenediamine, 2-cyclohexyl-4,5-diethyl-1,3-phenylenediamine, 2-cyclohexyl-2,6-isopropyl-1,3-phenylenediamine, 2,3-dimethyl-6-(1-ethyl-n-propyl)-1,3-phenylenediamine, and 2,4-dimethyl-6-(1,1,-dimethyl-n-propyl)-1,3-phenylenediamine. Preferred examples include 1-methyl-3,5-diethyl-2,4- and 2,4-phenylenediamines, 2,4-dimethyl-6-tert-butyl-1,3-phenylenediamine, 2,4-dimethyl-6-isooctyl-1,3-phenylenediamine and 2,4-dimethyl-6-cyclohexyl-1,3-phenylenediamine.

Suitable 3,3'-di- and 3,3',5,5'-tetra-n-alkyl-substituted 4,4'-diaminodiphenylmethanes include, for example, 3,3'-dimethyl-, 3,3',5,5'-tetramethyl, 3,3'-diethyl-, 3,3',5,5'-tetraethyl-, 3,3'-di-n-propyl and 3,3',5,5'-tetra-n-propyl-4,4'-diaminodiphenylmethane.

Diaminodiphenylmethanes of the following formula are preferred:

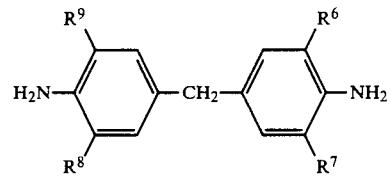

where $R^6$, $R^7$, $R^8$ and $R^9$ may be the same or different and denote a methyl group, an ethyl group, a propyl group, an isopropyl group, a secbutyl group and a t-butyl group, but at least one of the groups must be an isopropyl group or a secbutyl group. The 4,4'-diaminodiphenylmethanes may also be used in mixture with isomers of the formulas

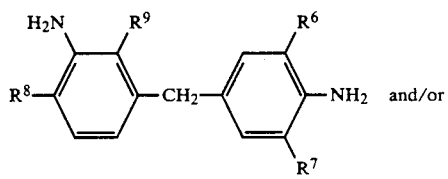

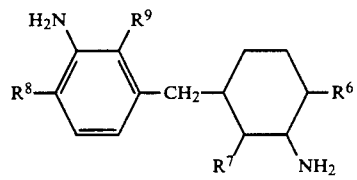

where $R^6$, $R^7$, $R^8$ and $R^9$ have the meanings given above.

The preferred diaminodiphenylmethanes are 3,5-dimethyl-3',5'-diisopropyl-4,4'-diaminodiphenylmethane and 3,3',5,5'-tetraisopropyl-4,4'-diaminodiphenylmethane. The diaminodiphenylmethanes may be used individually or in the form of mixtures.

These chain extenders and/or crosslinking agents (c) may be used individually or as mixtures of the same or different types of compounds.

If chain extenders, crosslinking agents or mixtures thereof are used, they are preferably used in amounts of 2 to 60 weight percent, preferably 8 to 50 weight percent, and especially 10 to 40 weight percent, based on the weight of components (b) and (c).

d) Suitable catalysts (d) include especially compounds that greatly accelerate the reaction of the hydroxyl group containing compounds of component (b) and optionally (c) with the organic, optionally modified, polyisocyanates (a). Examples include organic metal compounds, preferably organic tin compounds such as tin(II) salts of organic carboxylic acids, e.g., tin(II)acetate, tin(II)dioctoate, tin(II)ethylhexoate and tin(II)-laurate, as well as the dialkyltin (IV) salts of organic carboxylic acids, e.g., dibutyltin diacetate. The organic metal compounds are used alone or preferably in combination with strong basic amines. Examples include amines such as 2,3-dimethyl-2,3,4,5,6-tetrahydropyrimidine, tertiary amines such as triethylamine, tributylamine, dimethylbenzylamines, N-methylmorpholine, N-ethylmorpholine, N-cyclohexylmorpholine, N,N,N',N'-tetramethylethylenediamine, N,N,N',N'-tetramethylbutanediamine, pentamethyldiethylenetriamine, tetramethyldiaminoethyl ester, bis(dimethylaminopropyl) urea, dimethylpiperazine, 1,2-dimethylimidazole, 1-aza-bicyclo [3.3.0]octane and preferably 1,4-diaza-bicyclo[2.2.2]octane; and alkanolamine compounds such as triethanolamine, triisopropanolamine, N-methyl- and N-ethyldiethanolamine and dimethylethanolamine.

Suitable catalysts also include tris(dialkylamino)-s-hexahydrotriazines, especially tris(N,N-dimethylaminopropyl)-s-hexahydrotriazine; tetraalkylammonium hydroxides such as tetramethylammonium hydroxide; alkali hydroxides such as sodium hydroxide; and alkali alcoholates such as sodium methylate and potassium isopropylate, as well as alkali salts of long-chain fatty acids with 10 to 20 carbon atoms and optionally OH pendant groups. 0.001 to 5 weight percent, especially 0.05 to 2 weight percent of catalyst or catalyst combination based on the weight of component (b) is preferred.

e) According to the present invention, the novel copolymers of one of claims 1 through 5 are used in the preparation of the polyisocyanate addition polymerization products as auxiliaries and/or additives. Here, depending on the type of application and structure of the copolymer, said copolymers are used in different quantities, for example, copolymers having polyester alcohol adducts polymerized in situ are preferred in combination with polyester polyols and copolymers having polyoxyalkylene alcohol adducts polymerized in situ are preferred in combination with polyether polyols. If the copolymers are used as dispersing agents and/or emulsification agents then typically they are used in quantities of from 0.01 to 5 weight percent, more preferably 0.1 to 2 weight percent based on the weight of the higher molecular weight compounds having at least 2 reactive hydrogen atoms (b). If the novel copolymers are used in combination with other surface active compounds which also have a dispersing or emulsifying effect then the exact quantity required can be determined by simple experimentation. For improving the mechanical properties of polyisocyanate addition polymerization products prepared, typically 3 to 15 weight percent, and more preferably 4 to 10 weight percent of copolymer is used based on the total weight of higher molecular weight compound (b).

To prevent or minimize shrinkage in the preparation of molded articles, typically used is 2 to 15 weight percent, more preferably 3 to 11 weight percent based on the weight of higher molecular weight compound (b).

Other additives and/or auxiliaries (e) may also be incorporated into the reaction mixture in addition to the novel copolymers used for improving dispersing and/or emulsification, for minimizing shrinkage of molded articles and increasing the mechanical property level of the polyisocyanate addition polymerization products prepared. Examples include surface active substances, fillers, flame retardants, dyes, pigments, release agents, agents to protect against hydrolysis and fungistatic and bacteriostatic agents.

Examples of surface active substances include: sodium salts of castor oil sulfates or of fatty acids as well as salts of fatty acids with amines, e.g., diethanolamine oleate, diethanolamine stearate, diethanolamine ricinoleate, salts of sulfonic acids, e.g., alkali or ammonium salts of dodecylbenzenesulfonic acid or dinaphthylmethanedisulfonic acid and ricinoleic acid; foam stabilizers such as siloxane-oxyalkylene copolymers and other organopolysiloxanes, ethoxylated alkyl phenols, ethoxylated fatty alcohols, paraffin oils, castor oil and ricinoleic acid esters, Turkey red oil and peanut oil as well as cell regulators such as paraffins, fatty alcohols and dimethyl polysiloxanes. Furthermore, the oligomeric acrylates with polyoxyalkylene and fluoroalkane side groups are also suitable for improving the emulsifying effect, the cell structure and/or for stabilizing the foam. These surface-active substances are generally used in amounts of 0.01 to 5 parts by weight based on 100 parts by weight of component (b).

Fillers, especially reinforcing fillers, are understood to refer to the known conventional organic and inorganic fillers, reinforcing agents, weighting agents, agents to improve abrasion properties in paints, coatings agents, etc. Specific examples include inorganic fillers such as silicate minerals, e.g. layered silicates such as antigorite, serpentine, hornblendes, amphiboles, chrysotile, talc; metal oxides such as kaoline, aluminum oxides, titanium oxides and iron oxides, metal salts such as chalk, heavy spar and inorganic pigments such as cadmium sulfide, zinc sulfide as well as glass beads and short glass fibers. Kaolin (China clay), aluminum silicate and coprecipitates of barium sulfate and aluminum silicate as well as natural and synthetic fibrous minerals such as wollastonite are preferred. Examples of organic fillers include carbon black melamine, colophony, cyclopentadienyl resins, melamine formaldehyde and urea-formaldehyde condensates.

The organic and inorganic fillers may be used individually or as mixtures and are preferably incorporated into the reaction mixture in amounts of 0.5 to 50 weight percent, preferably 1 to 40 weight percent, based on the weight of components (a) to (c).

Suitable flame retardants include, for example, tricresyl phosphate, tris-2-chloroethyl phosphate, trischloropropyl phosphate, tris-2,3-dibromopropyl phosphate, and tetrakis(2-chloroethyl)-ethylene diphosphate.

In addition to the above mentioned halogen substituted phosphates one can also use inorganic flame retardants, such as antimony trioxide, arsenic oxide, ammonium phosphate, ammonium sulfate, aluminum hydroxide and red phosphorous, as well as isocyanuric acid derivatives, such as melamine, dicyanic diamide and guanidine salts, for example, guanidine carbonate in order to make the polyisocyanate addition polymerization products flame resistant. Generally it has been shown to be advantageous to use from 5 to 50 parts by weight, more preferably 5 to 25 parts by weight of said fire retardant for each 100 parts by weight of the mixture comprising starting components (a) through (c).

Typical release agents, preferably internal release agents which are used in quantities of from 0.05 to 2 weight percent based on the (b) component are, for example, stearyl stearate, carboxylic acid esters and/or carboxylic acid amides prepared by the esterification or amidation of a mixture of montanic acid and at least one aliphatic carboxylic acid having at least 10 carbon atoms with at least difunctional alkanolamines, polyols and/or polyamines having molecular weights of from 60 to 400 as disclosed in European Patent A 153 639; or stearates of alkali, alkaline earth or other metals, such as, for example, disclosed in U.S. Pat. No. 4 519 965, European Patent A 218 175, European Patent A 240 715 or in Federal Republic of Germany 36 31 842.

Details regarding the aforementioned other conventional additives and auxiliaries can be obtained from the technical literature, e.g., in the Monograph by J. D. Sauders and K. C. Frisch "High Polymers", volume XVI, *Polyurethanes*, parts 1 and 2, Interscience Publishers, 1962 and 1964, or in the *Plastics Handbook, Polyurethanes*, volume VII, Carl-Hanser Publishers, Munich, Vienna, 1st and 2nd editions, 1966 and 1983.

f) Low boiling point liquids soluble in the (b) component or emulsifiable liquids which both evaporate under the influence of the exothermic addition polymerization reaction are used as blowing agents in the preparation of cellular polyisocyanate addition polymerization products, preferably foams and cellular elastomers. Suitable liquids are those which are inert to the organic polyisocyanate and which have boiling points below 100° C. Examples of such liquids used are halogenated hydrocarbons such as methylene chloride, trichlorofluoromethane, dichlorodifluoromethane, dichloromonofluoromethane, dichlorotetrafluoroethane and 1,1,2-trichloro-I,2,2-triflouroethane. In addition, mixtures of these low boiling point liquids can be used with one another and/or with other substituted or unsubstituted hydrocarbons.

Water is also suitable as a blowing adjacent which reacts with the polyisocyanates to form carbon dioxide and polyurea groups and which ultimately influences the compression strength of the end products. Since the water normally contained in the polyester polyols and polyether polyols as a byproduct is generally sufficient, often no additional water needs to be added. However, if the polyurethane formulation requires additional water then conventionally one uses from 0.05 to 4 weight percent, more preferably 0.5 to 3.0 weight percent of water based on the weight of starting component (b).

The most effective amount of low boiling point liquid used to prepare the cellular polyisocyanate addition polymerization products depends on the density desired and optionally on the amount of water used. Generally 1 to 15 parts by weight, more preferably 2 to 6 parts by weight based on 100 parts by weight of component (b) provide satisfactory results.

When preparing the urethane group containing foams and urethane and/or urea group containing non-cellular or cellular elastomers the organic and/or modified organic polyisocyanates (a) are reacted with the higher molecular weight compounds having at least two reactive hydrogen atoms (b) and preferably chain extending agents and/or crosslinking agents (c) in such quantities so that the ratio of reactive hydrogen atoms to NCO groups is from 1:0.8 to 2.5, more preferably 1:0.9 to 1.2 and most preferably about 1:1.

When preparing urethane and isocyanurate group containing foams, starting components (a), (b) and optionally (c) are used in such quantities so that the ratio of NCO groups to reactive hydrogen atoms is from 3 to 60:1, more preferably 3 to 10:1.

The urethane group or urethane and isocyanurate group containing foams and urethane and/or urea group containing noncellular or cellular elastomers are prepared in a conventional fashion following the prepolymer process, semi-prepolymer process or the one-shot process. Here, starting components (a), (b), (d), (e) and optionally (c) and/or (f) are intensively mixed together in the aforesaid quantity ratios at temperatures of from 0° to 60° C., more preferably 15' to 40° C. and the reaction mixture is allowed to foam up in an open mold or in a mold closed after filling. When using a mixing device having several feed nozzles the starting components can be fed in as individual materials then intensively mixed in the mixing chamber. However, it has proven more practical to work according to a so-called 2-component process and to combine the higher molecular weight compounds having at least 2 reactive hydrogen atoms (b), with catalysts (d), auxiliaries and/or additives (e) and optionally chain extending agents and/or crosslinking agents (c) and/or blowing agent (f) into the (a) component and then to use organic and/or modified organic polyisocyanates as component (b). The advantage here is that only two components need to be stored and mixed before processing.

The foams prepared according to the above mentioned process have free rise densities of from 0.015 to 0.5 g/m³, more preferably 0.025 to 0.3 g/m³. The foams are used, for example, as seat cushions for furniture or in the transportation industry; as mattresses, mats for lining or for coating molded articles and for insulation purposes.

The optionally compressed cellular elastomers have densities of from 0.15 to 1.1 g/m³, more preferably 0.3 to 0.8 g/m³ and they are used, for example, as headrests, arm rests, steering wheels in the transportation industry and as computer housings and window edging.

The non-cellular elastomers have densities of from 0.9 to 1.4 g/m³, more preferably 1.0 to 1.2 g/m³ and are suitable, for example, as impact protection moldings, fenders, wheel covers and spoilers for automobiles.

EXAMPLES

The copolymers described in the examples were prepared in conventional polymerization equipment suitable for carrying out reactions under pressure or reduced pressure, equipped with stirrers, reflux coolers, inert gas hookups, feed vessels, control thermometers and equipment for heating or cooling.

Determining the K-value was done according to DIN 53 726 in a 0.5 weight percent solution in isopropanol at 25° C.

The following monomers were used in the examples as the olefinic unsaturated polyester alcohol adducts and as the polyoxyalkylene alcohol adducts:

A1:
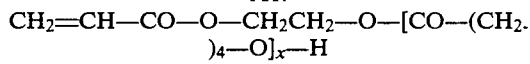

A mixture of adducts where x equals 1 to 5 units. Commercial product Tone ® TM-100 Acrylate from the Union Carbide Corporation.

A2: $CH_2=CH-CO-O-(C_2H_4O)_x-H$ having a hydroxyl number of 18.

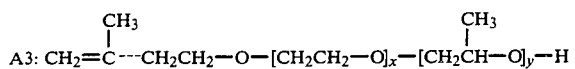

A3: $CH_2=\overset{\overset{CH_3}{|}}{C}-CH_2CH_2-O-[CH_2CH_2-O]_x-[CH_2\overset{\overset{CH_3}{|}}{CH}-O]_y-H$ Whereby x is about 103 and y about 3. The hydroxyl number is 11.

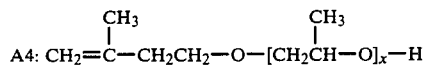

A4: $CH_2=\overset{\overset{CH_3}{|}}{C}-CH_2CH_2-O-[CH_2\overset{\overset{CH_3}{|}}{CH}-O]_x-H$ Having a hydroxyl number of 22.

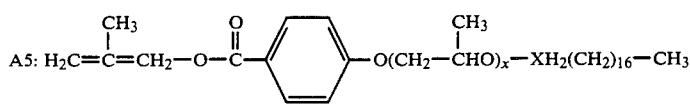

A5: $H_2C=\overset{\overset{CH_3}{|}}{C}=CH_2-O-\overset{\overset{O}{\|}}{C}-\bigcirc-O(CH_2-\overset{\overset{CH_3}{|}}{C}HO)_x-XH_2(CH_2)_{16}-CH_3$ x = approximately 103.

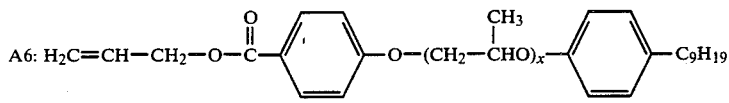

A6: $H_2C=CH-CH_2-O-\overset{\overset{O}{\|}}{C}-\bigcirc-O-(CH_2-\overset{\overset{CH_3}{|}}{C}HO)_x-\bigcirc-C_9H_{19}$ x = approximately 80.

PREPARATION OF THE COPOLYMERS

Example 1

Added to a mixture boiling with a slight reflux, comprising:
150 g of A3;
30 g of isopropanol;
55 g of mixture I; comprising:
200 g of N-vinylpyrrolidone;
100 g of vinyl acetate;
50 g of glycidylmethacrylate;
250 g of isopropanol; and
5 g of mixture II; comprising:
5 g of t.-butyl per-2-ethyl-hexanoate; and
32 g of isopropanol
over the course of 3 hours simultaneously while stirring, was the remaining 545 g of mixture I and 32 g of mixture II. Stirring continued for 3 hours at the reflux temperature and then within one hour the following was added to the reaction mixture:
20 g of a solution comprising:
5 g of t.-butyl per-2-ethylhexonate; and
15 g of isopropanol.
Copolymer C1 was obtained having a K value of 17.

Example 2

The procedure in example 1 was followed, however, 150 g of A2 was used in place of A3 and in place of mixture I, a mixture was used comprising 300 g of N-vinylpyrrolidone, 50 g of glycidylmethacrylate and 250 g of isopropanol.
Copolymer C2 was obtained having a K value of 23.

Example 3

The procedure in Example 1 was followed, however, 100 g of A1 was used in place of A3.
Copolymer C3 was obtained having a K-value of 20.

Example 4

A mixture comprising:
180 g of A3;
20 g of mixture I; comprising:
100 g of N-vinylpyrrolidone;
40 g of glycidyl methacrylate; and
200 g of isopropanol;
6 g of mixture II; comprising:
6 g of t-butyl per-2-ethylhexanoate; and
80 g of isopropanol
were heated while stirring to a temperature where weak refluxing occurred.
Over the course of 2.5 hours while stirring the remaining 320 g of mixture I and 80 g of mixture II were added to the mixture and polymerization continued for one hour at the mild refluxing temperature.
Subsequently within 30 minutes,
36 g of a mixture comprising:
6 g of t-butyl per-2-ethylhexanoate and
30 g of isopropanol
were incorporated into the reaction mixture and polymerization terminated in an hour.
Copolymer C4 was obtained having a K value of 12.

Examples 5 through 7

Preparation of a dispersion of copolymer C4 in ethylene glycol.

332 g of ethylene glycol was added to the solution of copolymer C4 in isopropanol prepared according to example 4 and then the isopropanol was removed by fractional distillation under reduced pressure. The resulting dispersion was adjusted using ethylene glycol to a copolymer C4 content of 50 weight percent.

To prepare a homogeneous mixture and to determine its stability, a mixture of a polyoxypropylene(80 weight percent)-polyoxyethylene (20 weight percent)triol having a hydroxyl number of 26 prepared by the addition polymerization of 1,2-propylene oxide on trimethylolpropane and the subsequent addition polymerization of ethylene oxide on the resulting trimethylolpropane polyoxypropylene adduct (henceforth abbreviated Lu 2042), and ethylene glycol in various quantities was added to the above described copolymer C4/ethylene glycol dispersion (henceforth abbreviated C4-Et-D). The homogeniety was reported after six weeks of storage.

| Example | Lu 2042 Parts by Weight | Ethylene glycol Parts by Weight | Mixture Parts by Weight | C4-Et-D Parts by Weight | Homogeniety |
|---|---|---|---|---|---|
| 5 | 70 | 30 | 100 | 0 | Inhomogenous. Formation of |

-continued

| Example | Lu 2042 Parts by Weight | Ethylene glycol Parts by Weight | Mixture Parts by Weight | C4-Et-D Parts by Weight | Homogeniety |
|---|---|---|---|---|---|
| 6 | 70 | 30 | 95 | 5 | two phases Homogenous. Stable solution |
| 7 | 70 | 30 | 99 | 1 | Homogenous. Stable solution |

Example 8

Added to 0.5 parts by weight of C4-Et-D was 99.5 parts by weight of a mixture comprising:

27.9 parts by weight of a polyoxypropylene(86 weight percent) polyoxyethylene(14 weight percent)-triol, having a hydroxyl number of 28 prepared by the addition polymerization of 1,2-propylene oxide on glycerin and subsequent addition polymerization of ethylene oxide on the resulting glycerin polyoxypropylene adduct;

27.9 parts by weight of a polyoxypropylene(87 weight percent) polyoxyethylene(13 weight percent)-triol, having a hydroxyl number of 35 prepared by the addition polymerization of 1,2-propylene oxide on trimethylolpropane and subsequent addition polymerization of ethylene oxide on the resulting trimetholpropane-polyoxypropylene adduct; and 6.3 parts by weight of ethylene glycol.

The mixture was still homogeneous after six weeks and showed no signs of phase separation.

EXAMPLE 9

Added to 0.5 parts by weight of C4-Et-D was 99.5 parts by weight of a mixture comprising:

87 parts by weight of a polyoxypropylene(81.5 weight percent), polyoxyethylene(18.5 weight percent)-triol, having a hydroxyl number of 29 prepared by the addition polymerization of 1,2-propylene oxide on glycerin and subsequent addition polymerization of ethylene oxide on the resulting glycerin polyoxypropylene adduct;

12.2 parts by weight of a polyoxypropylene(80 weight percent) polyoxyethylene(20 weight percent)-triol, having a hydroxyl number of 26 prepared while using trimethylolpropane as an initiator molecule;

5.3 parts by weight of a polyoxypropylene(86.5 weight percent) polyoxyethylene(13.5 weight percent)-triol, having a hydroxyl number of 35 prepared while using glycerin as an initiator molecule; and 8.1 parts by weight of 1,4-butanediol.

Following six months of storage the resulting mixture showed no signs of phase separation.

Example 10

A mixture comprising:
180 g of A3; and
20 g of a solution I comprising:
  100 g N-vinylpyrrolidone;
  40 g of glycidyl methacrylate; and
  160 g of isopropanol
    were heated to 110° C. while stirring.
6 g of solution II comprising:
  6 g of t-butylperoctoate; and
  64 g of isopropanol was incorporated into the mixture and the reaction mixture was then prepolymerized for 15 minutes.

Following this over the course of 2 hours while stirring at 110° C. simultaneously added to the mixture was the remaining 380 g of solution I and 64 g of solution II and polymerization continued for an additional 2 hours.

After adding 23 g of solution III comprising:
  6 g t-butylperoctoate; and
  40 g of isopropanol
polymerization continued another 1.5 hours under the above stated reaction conditions and following this the remaining 23 g of solution III were added to the reaction mixture.

Following a post polymerization time of 2 hours, the copolymer solution cooled to room temperature in about 12 hours.

Copolymer C5 was obtained having a K-value of 17.5.

Example 11

The procedure in example 10 was followed, however, in place of solution I a mixture comprising the following was used:
  40 g N-vinylpyrrolidone;
  12 g N-diacetoneacrylamide;
  10 g glycidylmethacrylate; and
  160 g isopropanol.

Copolymer C6 was obtained having a K-value of 15.0.

Examples 12 through 14

Preparation of dispersions of copolymers C5 and C6 in a polyoxypropylene(86 weight percent)polyoxyethylene(14 weight percent)triol initiated with glycerin having a hydroxyl number of 28 and henceforth abbreviated Lu 2040.

The following quantities of Lu 2040 were added to the copolymer C5 and C6 solutions prepared according to examples 10 and 11, and subsequently the isopropanol was removed by fractional distillation under reduced pressure. The resulting dispersions were adjusted with Lu 2040 to a copolymer content of 50 weight percent.

|  | Lu 2040 [g] |
|---|---|
| Copolymer C5 dispersion | 298 |
| Copolymer C6 dispersion | 358 |

Preparation of Stable Melamine Polyether Polyol Dispersions

The above mentioned copolymer C5 or C6 Lu 2040 dispersions were added to a mixture of Lu 2040 and melamine. The following table illustrates the quantities used and stability reported on the resulting melamine/Lu 2040 dispersions after 5 weeks of storage:

| Example | Lu 2040 Parts by wt. | Melamine* Parts by wt. | Copolymer/ Lu 2040 dispersion Type | Copolymer/ Lu 2040 dispersion Parts by wt. | Stability |
|---|---|---|---|---|---|
| 12 (comparison) | 52 | 48 | — | — | demulsified |
| 13 | 51 | 48 | C5 | 1 | stable |

-continued

| Example | Lu 2040 Parts by wt. | Melamine* Parts by wt. | Copolymer/Lu 2040 dispersion Type | Parts by wt. | Stability |
|---|---|---|---|---|---|
| 14 | 51 | 48 | C6 | 1 | stable |

*Melamine U 24 from BASF AG

Example 15

Simultaneously added within 5 minutes while stirring to 720 g of A 4 heated to 100° C. was:
65 g of mixture I comprising:
400 g N-vinylpyrrolidone;
160 g glycidyl methacrylate; and
250 g isopropanol; and
19 g of mixture II comprising:
24 g t-butyl per-2-ethylhexonate; and
320 g of isopropanol.

The reaction mixture was polymerized for 15 minutes while mildly refluxing the isopropanol, then over the course of 2 hours while stirring at 95° to 100° C. simultaneously added was the remaining 745 g of mixture I and the 325 g of mixture II and then the reaction mixture was polymerized for 2 hours employing reflux cooling.

After adding 92 g of mixture III comprising:
24 g t-butyl per-2-ethyl-hexanoate; and
160 g of isopropanol
polymerization continued an additional 1.5 hours under the above stated reaction conditions then subsequently the remaining 92 g of mixture III was added to the reaction mixture within 5 minutes and polymerization continued for 2 hours.

Copolymer C7 was obtained having a K-value of 23.

Example 16

The copolymer C7 solution prepared according to example 15 was mixed with 1380 g of Lu 2040 and subsequently the isopropanol was removed by fractional distillation under reduced pressure. The resulting dispersion had a copolymer content of 50.3 weight percent.

Example 17

The procedure in example 16 was followed, however, in place of Lu 2040 polyether polyol Lu 2042 was used. The resulting dispersion had a copolymer content of 50 weight percent.

Example 18

Preparation of a shrinkage resistant polyurethane semi-rigid foam.

A Component

A mixture comprising:
79.0 parts by weight of Lu 2040;
5.0 parts by weight of a polyoxypropylene tetrol having a hydroxyl number of 768 prepared while using ethylene diamine as an initiator molecule;
2.0 parts by weight of a polyoxypropylene(26 weight percent) polyoxyethylene(24 weight percent)triol, having a hydroxyl number of 42 prepared while using glycerin as an initiator molecule;
10.0 parts by weight of an emulsifier dispersion prepared according to example 16;
0.5 parts by weight of triethanolamine;
2.5 parts by weight of water;
0.4 parts by weight of a silicone oil (Tegostab® B 4690 from Goldschmidt AG, Essen, Federal Republic of Germany); and
0.6 parts by weight of potassium acetate (a 40 weight percent solution in ethylene glycol).

B Component

A mixture of diphenylmethane diisocyanates and polyphenylpolymethylene polyisocyanates having a NCO content of 31 weight percent.

In preparing the foam 100 parts by weight of the A component and 54.7 parts by weight of the B component were intensively mixed together at 23° C., and using the flowable reaction mixture a polyvinylchloride-acrylonitrile-butadiene-styrene rubber film was poured in place in a conventional fashion. The semi-rigid polyurethane foam produced cured without shrinking.

Example 19

The procedure in example 15 was followed, however, in place of mixture I described therein, the following mixture was used comprising:
200 g N-vinylpyrrolidone;
160 g glycidyl methacrylate;
200 g styrene; and
250 g isopropanol.
Copolymer C8 resulted having a K-value of 22.

Example 20

The copolymer C8 solution prepared according to example 19 was mixed with 1300 g of Lu 2042 and subsequently the isopropanol was removed by fractional distillation under reduced pressure. The resulting colorless dispersion had a copolymer content of 50.4 weight percent.

Example 21

The procedure in example 15 was followed, however, in place of mixture I described therein a mixture comprising the following was used:
300 g N-vinylpyrrolidone;
160 g glycidyl methacrylate;
100 g styrene; and
250 g isopropanol.
In addition, in place of mixture II described in example 15 a mixture comprising the following was used:
24 g t-butyl per-2-ethylhexanoate and
350 g isopropanol.
Copolymer C9 was obtained having a K-value of 18.

Example 22

Added simultaneously within 5 minutes while stirring to 720 g of A5 heated to 100° C. was:
65 g of mixture I comprising:
400 g N-vinylpyrrolidone;
160 g glycidylmethacrylate; and
250 g isopropanol; and
19 g of mixture II comprising:
24 g t-butyl per-2-ethylhexanoate; and
320 g isopropanol.

The reaction mixture was polymerized for 15 minutes while mildly refluxing the isopropanol and then over the course of 2 hours while stirring at 95° to 100° C. simultaneously added was the remaining 745 g of mixture I and 325 g of mixture II and then the reaction mixture was polymerized for 2 hours employing reflux cooling. After adding 92 g of mixture III comprising 24 g t-butyl per-2-ethylhexanoate and 160 g of isopropanol polymerization continued an additional 1.5 hours under the above stated reaction conditions. Subsequently the remaining 92 g of mixture III was added to the reaction mixture within 5 minutes and polymerization continued for 2 hours.

Copolymer C10 was obtained having a K-value of 30.

Example 23

The procedure in example 22 was followed, however, in place of A5 the unsaturated monomer A6 was used.

Copolymer C11 was obtained having a K-value of 24.

Example 24

Preparation of a low shrinkage urethane and urea group containing elastomer molded article.

A Component

A mixture comprising:
- 71.50 parts by weight of a polyoxypropylene(80 weight percent) polyoxyethylene(20 weight percent)triol, having a hydroxyl number of 26 prepared by the addition of 1,2-propylene oxide on trimethylolpropane and subsequent addition polymerization of ethylene oxide on the resulting trimethylolpropane-polyoxypropylene adduct;
- 20.00 parts by weight of 3,5-diethyltoluene-2,4-diamine;
- 1.25 parts by weight of 1,4-diazabicyclo[2.2.2]octane dissolved [in] 33 weight percent dipropylene glycol;
- 0.25 parts by weight of dibutyltin dilaurate;
- 5 parts by weight of an internal mold release prepared analogous to the teachings of Federal Republic of Germany 26 31 842 comprising 31 parts by weight of a ketimine based on a polyoxyalkylene polyamine (Jeffamine ® D230), cyclohexanone and methylisobutylketone,
- 8.0 parts by weight of oleic; acid and
- 61.0 parts by weight of zinc stearate; and
- 3 parts by weight of the emulsion dispersion of example 17.

B Component

A mixture of 4,4'-diphenylmethane diisocyanate modified with polyoxypropylene glycol having a NCO content of 23 weight percent. The (A) and (B) components were heated to 50° C., mixed in a ratio of (A):(B) equalling 100:57 parts by weight utilizing a reaction injection molding process on a high pressure proportioning machine of the type Puromat ® 30 from Elastogran Maschinenbau, and injected into an aluminum mold heated to 65° C. in the shape of an automobile door side panel having approximate internal dimensions of 2×1000×10 mm, to form a molded article.

The molded article obtained had an approximate shrinkage of 0.4% compared to a molded article prepared from the same starting components, however, without using the emulsifier dispersion of example 17.

We claim:

1. Copolymers having a K-value of 5 to 80, measured as a 0.5 weight percent solution in isopropanol at 25° C., prepared in the presence of polymerization initiators by the radical polymerization of:

A) 20 to 80 weight percent, based on the total weight of monomers (A) and (B), of at least one olefinic unsaturated polyoxyalkylene alcohol adduct or polyester alcohol adduct;

B) 80 to 20 weight percent, based on the total weight of monomers (A) and (B), of at least one vinyl monomer selected from the group consisting of N-vinyl-formamide, N-vinyl-2-pyrrolidone, N-vinyl-2-piperidone, N-vinyl-2-caprolactam, N-vinyl-imidazole, N-vinyl-2-ethylene urea ano N-vinyl-2-propylene urea;

C) 0.05 to 40 weight percent, based on 100 parts by weight of monomers (A) and (B), of glycidyl acrylate, glycidyl methacrylate or mixtures thereof;

D) 0 to 10 parts by weight based on 100 parts per weight of monomers (A) and (B) of at least one a,b-monoolefinic unsaturated acid and;

E) 0 to 30 parts by weight based on 100 parts per weight of monomers (A) and (B) of at least one olefinic unsaturated carboxylic acid amide, and/or olefinic unsaturated carboxylic acid ester and/or styrene.

2. The copolymers of claim 1 wherein the olefinic unsaturated polyoxyalkylene alcohol adducts or polyester alcohol adducts (A) have one of the following structural formulas (I) through (VIII):

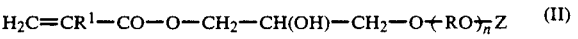

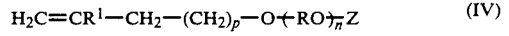

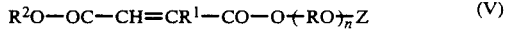

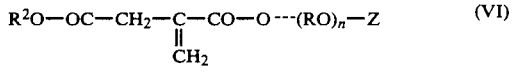

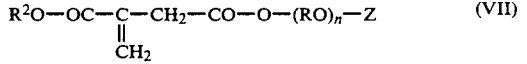

and

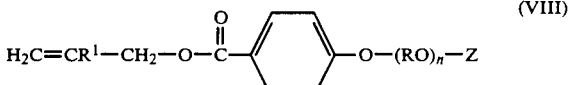

in which
R$^1$ and R$^2$ are each hydrogen or a linear or branched alkyl group having 1 to 4 carbon atoms, whereby R$^1$ and R$^2$ are the same or different;
R are the same or different bridge members having one of the following formulas: —CH$_2$CH$_2$—, —CH$_2$CH(CH$_3$)—,

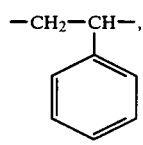

—CH$_2$CH$_2$CH$_2$CH$_2$—
or —CO—(CH$_2$)$_m$—O—, whereby m is a whole from 1 to 10; Z is hydrogen, a linear or branched alkyl radical having 1 to 24 carbon atoms, a linear or branched fluoro substituted alkyl radical having 1 to 24 carbon atoms, an aryl radical or an alkyl substituted aryl radical;

n is a whole number from 2 to 200; and p is a whole number from 1 to 18.

3. The copolymers of claim 1 wherein the a,b-monoolefinic unsaturated acid (D) is selected from the group consisting of acrylic acid, methacrylic acid, maleic acid. fumaric acid, itaconic acid, vinyl sulfonic acid, and vinyl phosphonic acid.

4. The copolymers of claim 1 wherein the olefinic unsaturated carboxylic amides or olefinic unsaturated carboxylic acid esters (E) are selected from the group consisting of N,N-dialkylacrylamides, N,N-dialkylmethacrylamides, N-alkyl-acrylamides, N-alkylmethacrylamides having 1 to 12 carbon atoms in the alkyl radical, acrylamide, methacrylamide, vinyl carboxylic acid ester having 1 to 20 carbon atoms in the alkanoyl radical, alkylacrylates, alkylmethacrylates, hydroxyalkylacrylates and hydroxyalkylmethacrylates having 1 to 24 carbon atoms in the alkyl radical or 2 to 10 carbon atoms in the hydroxy alkyl group.

5. The copolymers of claim 1 wherein (D) is 0.1 to 10 parts by weight, based on 100 parts by weight of monomers (A) and (B), of an olefinic unsaturated acid selected from the group consisting of acrylic acid, methacrylic acid, maleic acid, fumaric acid, itaconic acid, vinyl sulfonic acid, and vinyl phosphonic acid.

6. The copolymers as claimed in claim 1 wherein said copolymers may be used as dispersing auxiliaries and/or emulsification auxiliaries in formulations or partial mixtures of said copolymers for the preparation of polyisocyanate addition polymerization products and/or as additives for improving the mechanical properties of polyisocyanate addition polymerization products prepared from these formulations.

7. The copolymers as claimed in claim 1 wherein said copolymers may be used as an additive in formulations for the preparation of practically shrinkage-free molded articles based on urethane group or urethane and urea group containing elastomers or foams.

8. The copolymers as claimed in claim 1 wherein said copolymers may be used as a dispersing auxiliary in the preparation of storage stable dispersions from at least one powdered solid, preferably melamine, and at least one polyester polyol and/or polyether polyol liquid at 25° C.

9. A process for the preparation of polyisocyanate addition polymerization products, by reacting:

a) organic polyisocyanates and/or modified organic polyisocyanates with;

b) higher molecular weight compounds having at least 2 reactive hydrogen atoms and optionally;

c) chain extending agents and/or cross-linking agents;

in the presence of d) catalysts;

e) auxiliaries and/or additives in the presence of or absence of;

f) blowing agents;

wherein the copolymers described by claims 1 through 6 may be used as the auxiliary agent and/or the additive.

* * * * *